(12) United States Patent
Ottesen et al.

(10) Patent No.: US 6,424,484 B1
(45) Date of Patent: Jul. 23, 2002

(54) APPARATUS WITH AND METHOD OF UNIQUE DISK IDENTIFICATION FOR MAGNETIC HARD DISK DRIVES

(75) Inventors: Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,968

(22) Filed: Feb. 18, 2000

Related U.S. Application Data

(62) Division of application No. 09/439,627, filed on Nov. 12, 1999, now Pat. No. 6,222,697, which is a continuation of application No. 08/796,988, filed on Feb. 7, 1997, now abandoned.

(51) Int. Cl.$^7$ .............................. G11B 21/02; G11B 5/05
(52) U.S. Cl. ............................................. 360/75; 360/48
(58) Field of Search ........................... 360/135, 48, 69, 360/75

(56) References Cited

U.S. PATENT DOCUMENTS

| | | | | |
|---|---|---|---|---|
| 3,959,625 A | * | 5/1976 | Kashio | 235/61.11 E |
| 4,498,146 A | * | 2/1985 | Martinez | 364/900 |
| 4,783,705 A | * | 11/1988 | Moon et al. | 360/77.08 |
| 5,784,216 A | * | 7/1998 | Zaharris | 360/53 X |
| 5,822,291 A | * | 10/1998 | Brindze et al. | 369/94 |
| 5,907,144 A | * | 5/1999 | Poon et al. | 235/462.08 |

FOREIGN PATENT DOCUMENTS

| | | | |
|---|---|---|---|
| JP | 2-173994 | * | 7/1990 |
| JP | 10-105642 | * | 4/1998 |

* cited by examiner

Primary Examiner—Andrew L. Sniezek
(74) Attorney, Agent, or Firm—Laurence R. Letson

(57) ABSTRACT

A bar coded magnetic recording pattern uniquely identifying the disk of a disk drive is disposed, at the time the disk is single disk tested and accepted, in a reserved area that is not used for data recording by the disk drive assembly. The identifying recording is disposed in a reserved region that is accessible by the magnetic transducer of the disk drive. The identifying recording may be read to determine the orientation of the disk in the disk drive and may be read to positively identify the disk to permit repair, recall or data transfer from specifically identified disks without shut down and/or disassembly of the disk drives incorporating the designated disks.

9 Claims, 3 Drawing Sheets

APPARATUS WITH AND METHOD OF UNIQUE DISK IDENTIFICATION FOR MAGNETIC HARD DISK DRIVES

This is a divisional application of application Ser. No. 09/439,627, filed Nov. 12, 1999, now U.S. Pat. No. 6,222,697, which is a continuation of application Ser. No. 08/796,988, filed Feb. 7, 1997, now abandoned.

FIELD OF THE INVENTION

This invention relates to a method of manufacturing magnetic disk drives and, specifically, to the unique identification of magnetic disks before, during, and after the assembly of the disk drive.

BACKGROUND OF THE INVENTION

A system to avoid accessing of defects or defective regions on a storage media is disclosed in U.S. Pat. No. 4,498,146 to Maria N. Martinez. The locations of defects on the disk, provided by the disk manufacturer are used to construct a list or table of addresses of defects on the storage media and is recorded on the disk data recording surface. Through conversion, the defect address list is used to produce real addresses of the defects on the disk recording surface. The resulting defect address table is loaded into the disk file controller and the addresses are used to prevent accessing the defective regions during disk drive operations. New defects may be added to the defect address table as detected.

A system for detection of contamination errors for optical disks is disclosed in U.S. Pat. No. 5,513,160 to Isao Satoh et al. The system first detects the defect errors on the disk and, at a later time, detects the total defect errors. The difference represents the contamination errors on an optical disk.

U.S. Pat. No. 5,075,804 issued to Deyring discloses a method for managing recording media defects. The identity and location of good or usable sectors of the recording tracks are maintained in an operating list stored in memory so that the disk drive microprocessor can avoid the use of bad sectors.

Presently, disk drives are comprised of disks that are not or have not been clearly individually identifiable. The disks have been individually tested and, if the disks pass the single disk test criteria, each single disk so tested and accepted is made available for assembly. Once assembled into the disk drive, these disks are retested for defects, and the locations of the defects are determined relative to the rotational datums of the disk drive. Thereafter, a defect table is assembled from the defect locations for each disk and stored on the media or in the memory of the disk controller. The duplicative testing of the disk is necessary both to prevent the use of a grossly defective disk and further to assemble the defect table of locations of the disk relative to disk drive established datums.

Currently, due to cost and inability to access and physically identify a unique disk surface once the disk drive is assembled, the surfaces of magnetic storage disks during the manufacturing process are not serially numbered or marked with any unique identification for later use in the assembled disk drive. Therefore, in the disk drive following assembly, the identity of a particular disk surface is not discernable.

Disk surfaces sometimes have laser scribed serialization; however, reading of the laser scribing requires a microprocessor and microprocessor associated image reading circuitry not found in a magnetic disk drive. Once assembled, however, the laser scribing is not readable in a magnetic disk drive.

As the current trend in magnetic disk drives of higher speed access rates continues, disk drives continue both to be reduced in size and also refined to store larger and larger amounts of data. Due to the very narrow width and close spacing of the data tracks on the disk, the affect of a surface defect in the recording media can render unusable, varying numbers of data tracks on a disk. A few surface defects affecting a nominal number of tracks may be tolerated; but, as the number of defects increases, the affected tracks and sectors soon start to severely limit the storage capacity of the disk.

The ability to identify and accurately account for or keep track of disk surfaces in assembled disk drives, particularly those drives in customer installations, is limited to identifying the disks by manufacturing lot or batch number. The manufacturing data for the disk drive may indicate the lot or batch numbers of the disks incorporated therein, but there is no certainty that the disk identity is reliable, particularly if there has been an overlap or changeover from lot to lot of disks incorporated into the disk drive assembly. Experience has shown that the lot or batch number associated in records with a particular disk drive is not accurate in many instances due to more than one lot or batch of disks being available on the manufacturing line at the same time, particularly whenever such lot or batch changeover occurs. Additionally, when more than one lot or batch number is used in a drive, presently there is no way to know which disk is from the lot being considered. Thus, in the event of a need to recall a lot or batch of disks due to a lot-wide defect, such as low coercivity of the magnetic coating or some other widespread type problem, a large number of disk drives may be needlessly recalled to insure that all the affected disks are identified.

It is very important that any disk drive placed in service not be displaced, removed from service, or disturbed imprudently because the affect can be extremely serious in terms of system down time. Being able to precisely identify individual disks already incorporated into an installed disk drive would permit avoiding use of a potentially defective disk in a drive, reduce the chance of data failure and an associated system crash and permit either the preservation of data or more orderly replacement of the disk drive at a time to minimize system disruption.

Serializing of a disk heretofore has been impractical at the single disk stage of manufacture inasmuch as the recording surface of the disk is not formatted at the single disk stage. Any widespread magnetic recording of readable data patterns thereon later interferes with reading and writing of data on the disk. Accordingly, the magnetic storing of a disk serial number and defect data on the disk has heretofore proved to be futile since the information either would not be reliably retrievable or the defect data would be effectively destroyed whenever the disk was formatted for servo control of the actuator following disk drive assembly and drive level testing.

Data storage disks typically have storage capacity on both sides of a disk. The disk surface includes a data storage region, an annular region near the periphery of the disk in which data is not stored, and an annular ring of substantial width which surrounds the central hole of the disk. As no effort is made to limit coating to only the data recordable portion of the surface, on each side of the disk, the magnetically coated and recordable surface of the annular storage portion of the disk extends between the central hole and the disk edge.

Part of the inner annular ring not used for data recording is used as a clamping region for engagement with inter-disk spacer rings resident on the disk drive hub. The balance of the inner annular ring and an outer ring adjacent the periphery of the disk may be used as a parking or landing zone or load/unload zone for the disk drive magnetic head whenever the drive is stopped, thereby preventing the head from contacting the recordable surface in the data storage zone of the disk surface which may result in disk surface and/or head damage.

The exposed portion of the inner ring and the outer ring are referred to as reserved areas. The manufacturing processes create recordable but otherwise unused surfaces in these reserved areas.

Heads for disk drives may be parked or loaded and unloaded either near the inner limits or the outer limits of the disk depending on the disk drive design. Thus, the magnetic read/write head is capable of being positioned at proper flying height over at least one of the reserved regions of a disk drive.

OBJECTS OF THE INVENTION

It is an object of the invention to readably serialize or otherwise readably uniquely identify each disk surface of a data storage disk drive at an individual disk level for identification in an assembled magnetic disk drive.

It is another object of the invention to serialize or otherwise uniquely identify the disk surfaces of a data storage drive in a manner that is readable in the assembled disk drive while not interfering with formatting, reading from or writing to such a disk surface.

It is a further object of the invention to improve the manufacturing and testing process of a disk drive and thereby enhance the reliability of the disk drive.

It is an additional object of the invention to enhance the accountability of the magnetic recording disks manufactured and tested for purposes of being able to identify specific disks in assembled disk drives and in customer systems.

It is a still further object of the invention to provide a method of manufacture for a data storage disk in such a manner as to permit the circumvention of a defective disk and the avoidance of a potentially disastrous incident and a possible loss of significant amounts of data.

It is yet another object to provide a disk drive with the ability to identify the disks incorporated therein by reading unique disk identifications from said disks.

SUMMARY OF THE INVENTION

A recordable magnetic disk for use in a magnetic disk drive is prepared using conventional disk fabrication, coating and curing techniques.

Thereafter, the disk is tested to determine defects in the magnetic disk recordable surface coating and/or ascertain the acceptability of the quality of the disk. If the defect level of the disk is excessive, the disk is scrapped and no record of the scrapped disk created or retained. Once a disk is determined to be acceptable, the disk is uniquely identified and a serial number or Disk Identification Number (DINUM) is recorded in one of the reserved areas of one side of the disk. The recording is made in a non-track specific manner, i.e., a magnetic pattern extending over a wide path in the selected reserved area. One example of such a recording pattern is a bar code type pattern which would extend across what might represent as many as 100 recording track widths. The recorded pattern not only provides uniquely identifying data but also a rotational orientation datum from which recording surface defects may be located.

Thereafter, the disk is selected and assembled with other parts and disks from varied lots or batches into a disk drive. The disk drive further is tested as a complete unit, and the defect location data previously determined in disk drive testing is retrieved from a computer data base using the DINUM or Disk Identification Number.

Formatting of the disk surfaces of the disk drive for servo control of the disk drive actuator is accomplished and supervised by a computerized routine which typically is not part of the control capability of the disk drive controller but rather the disk drive assembly testing controller. Thus, the formatting is accomplished after the single disk test.

During formatting of the disks, a pattern of recorded signals is recorded in each recording track of the typically 6,000 tracks on a 3½ inch diameter disk. The signals are referred to as servo patterns. These servo pattern signals are used to insure that tracking or following of the data track by the disk drive read/write head is controlled and accurate. Without accurate tracking, data cannot be reliably recorded or read.

The formatting of the disk and recording of the servo patterns on the disk may be rotationally positioned to maximize usable recording secotrs. By judiciously positioning the servo patterns relative to previously detected surface defects, the number of sectors affected by the defects may be minimized and the recording capacity of the disk maximized.

The defect data base for a particular disk thereafter is stored in a defect table on the disk's surface within the data storage area. The designations of areas identified by tracks and sectors which are usable also may be included in the defect table, as desired.

A greater understanding of the invention may be had from the drawings and the Detailed Description of the Invention to follow.

DRAWINGS

DETAILED DESCRIPTION OF THE INVENTION

Figure 1:
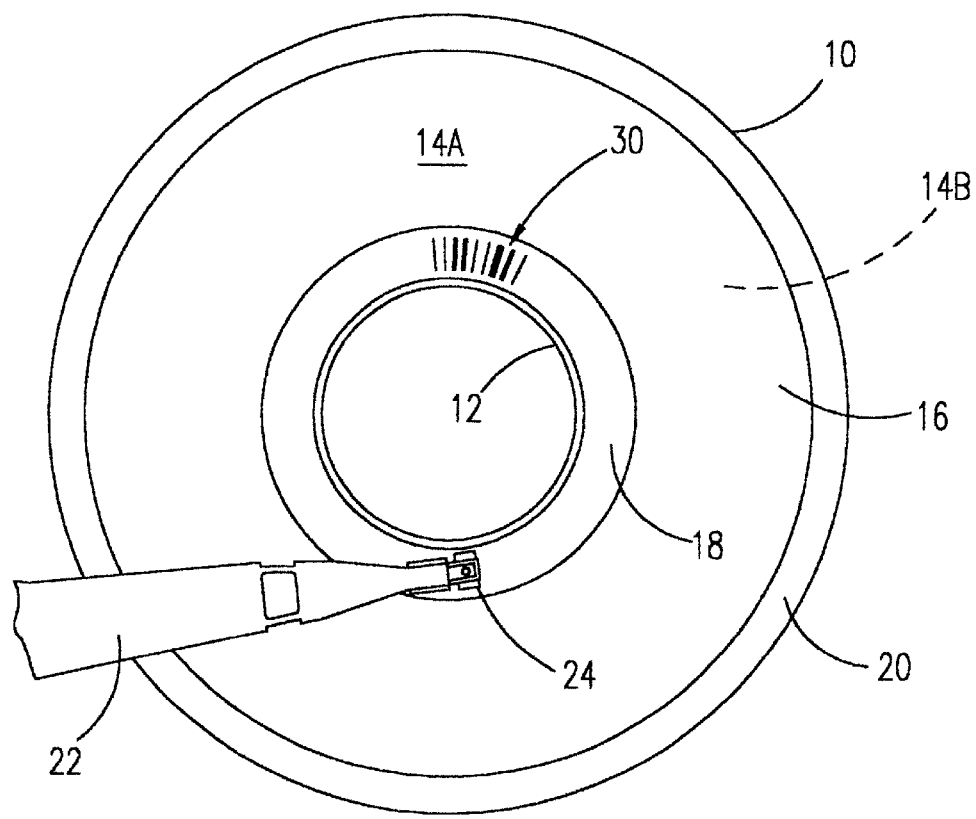
FIG. 1 is a depiction of a surface of a data disk incorporating the invention and an associated tester read/write head and arm.

The following is a detailed description of the best mode of the preferred embodiment of the invention as contemplated by the inventors. Referring now to FIGS. 1–4, the central opening 12 of disk 10 is sized to accept a hub 13 or rotor 13 of a disk drive 26, such as that disclosed in FIG. 4. The central opening 12 is surrounded by a relatively wide zone 18 which, like the remainder of the disk surface 14, data recording area 16 and outer zone 20 our outer reserved area 20, is coated with a magnetic recording media capable of receiving a series of recording signals and forming a magnetic pattern which may be read by the head 24 of a recording/reading apparatus such as a single disk tester. To test and format the disk 10 during assembly and disk drive testing, the read/write head 24 of the disk drive tester (not shown) used is sufficiently wide to record a magnetic pattern across a wide band so that the magnetic head 34 of disk drive 26, such as that in FIG. 4, can read the pattern without precise placement of the head 34 on a precise recording track 28 whenever the head 34 is disposed in the wide zone 18. Zone 18 may be used as a load/unload or landing zone for the magnetic head 34 whenever the disk drive 26 is stopped. Whenever flown over the DINUM 30, the magnetic head 34 may respond to the magnetic pattern.

Figure 2:
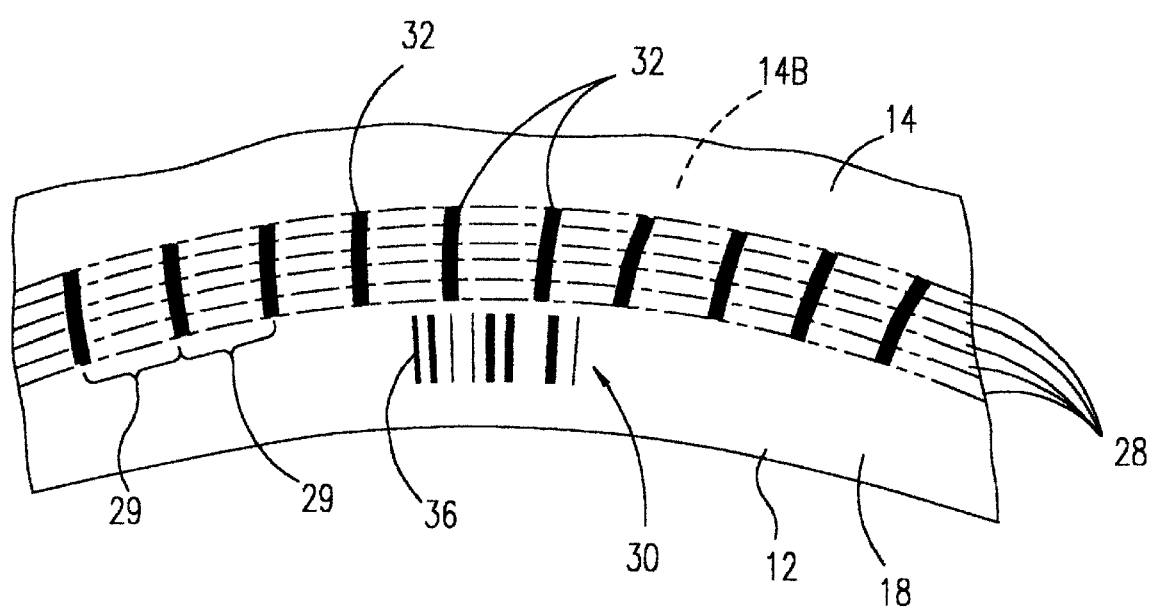
FIG. 2 is an illustration of a segment of the disk surface of FIG. 1.

The recorded servo pattern 32 on disk 10 is a pattern of servo signals recorded in arcs 31 about the pivot axis 23 of actuator 21 within uniform arcuate spacing, such as shown in FIG. 2. FIG. 2 shows a very limited portion of disk 10 embodying the invention. The Disk Identification Number (DINUM) 30 is shown recorded in a bar code pattern 30. The nature of the bar coding of DINUM 30 is not critical so long as the disk drive 26 is capable of reading and decoding the bar code pattern 30. The bar code pattern 30 or other suitable recording pattern is preferably written on the wide landing zone 18 during single disk testing of the disk 10, prior to disk drive assembly. Whenever the disk 10 is individually tested and determined to have a sufficiently small number and size of surface defects to meet the testing criteria, the disk 10 is accepted and the recording head 24 is positioned over the landing zone 18 or wide zone 18 and the DINUM 30 is recorded as described above.

The DINUM 30 then is correlated with the single disk test data which defines the location and size of the recording surface defects. This data is stored in a computer memory for use during servo formatting of the disks 10 and subsequently forming the defect table. Thereafter, the accepted disk 10 together with other disks which were accepted after individual disk testing are assembled into disk drives, such as disk drive 26 of FIG. 4, using conventional assembly techniques.

After disk drive assembly, the disk drive 26 further is tested as a functional unit; and, if found acceptable, the disks 10 in the disk pack (not visible) are formatted for servo control of actuator 21. Servo formatting of the disks 10 involves writing a servo pattern 32 of magnetic flux changes onto the magnetic disk surface 14. The servo pattern 32 recordings provide the signals necessary for the servo system or disk drive 26 and serve to define the annular recording tracks 28 around the disk surface 14, as shown in FIG. 2. The recording of the servo pattern 32 comprises creating a plurality of short burst or flux changes on the surface 14 of disk 10 in a defined pattern. The servo patterns 32 are spaced about every four (4) degrees around the disk 10 in or intersecting each recording track 28. The servo signals in an individual track 28 provide signals to the read/write head 34 of the disk drive 26 that physically define the recording track 28 and provide a control signal for compensating and moving the head 34 to eliminate any alignment error of the recording head 34 relative to the track 28. The servo pattern 32 signals and the servo control circuit in the disk drive 26 function to keep the recording head 34 centered over the recording track 28 to insure reliability of recording and reading of data.

Figure 3:
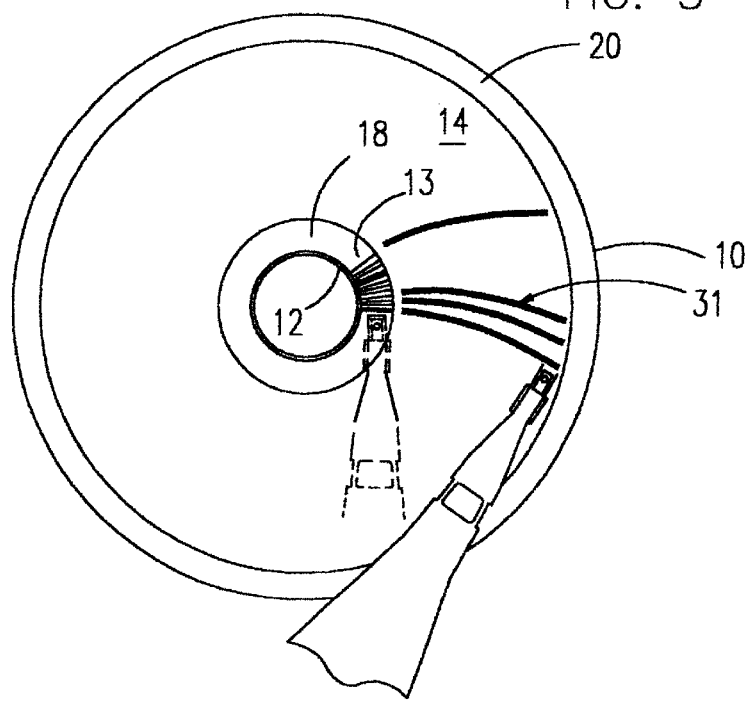
FIG. 3 is an illustration of the disk and the read/write head and actuator arm of a disk drive, shown in a variety of positions.
Figure 4:
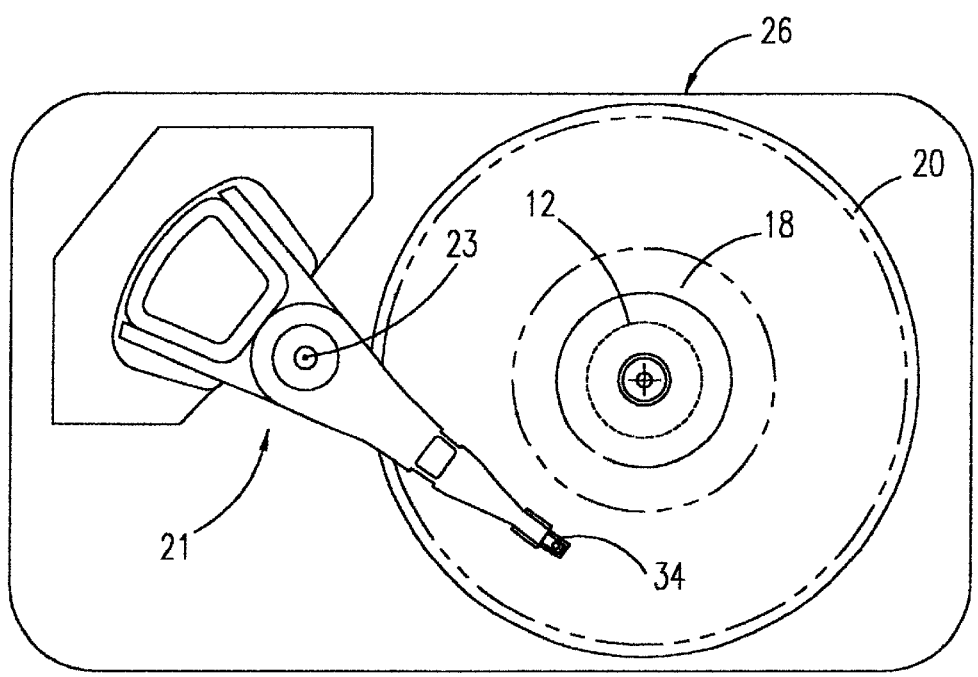
FIG. 4 is an illustration of a portion of a disk drive having a disk and an actuator.

Referring to FIG. 3, the recorded servo patterns 32 form arcs 31 extending across the recording tracks 28 in the path of the read/write head 34 as it is swept across the recording surface 16 of the magnetic disk 10. This assures that all sectors 29 registered at a particular rotational angle on the disk 10 begin and end at the same rotational displacement of the disk 10 relative to the disk drive 26 read write head 34. The pattern of arcs 31 of servo patterns 32, spaced at about four (4) degree intervals, are located relative to the magnetic recording of the DINUM 30, which forms a datum for the disk 10.

The formatting of servo patterns 32 may be shifted rotationally relative to the DINUM datum (the beginning of the recorded pattern 36) to some degree to optimize the recordable portion of the disk surface 14. With reference to FIG. 2, the existence of a surface defect within the data recording area 16 of the disk 10, even if affecting a small portion of a sector 29 in which it resides, renders the entire sector 29 unusable. Thus, if a defect would extend into adjacent sectors 29 but have a size such that it may be contained within fewer sectors 29, the number of affected and thus unusable sectors 29 may be reduced by shifting the servo patterns 32, maximizing the recordable capacity of the disk 10. Utilizing the test data defining the defect locations and the sizes of the defects stored after single disk 10 testing, the servo format pattern 32 can be shifted rotationally about the disk central opening 12 to minimize the number of sectors 29 affected by the defect.

As an example, if the size of a known defect is such that it will affect six (6) degrees of arc on the disk surface 14, one will understand that the defect could render as many as three sectors 29 unusable by spanning a complete four (4) degree sector 29 plus a portion of the preceding and a portion of the trailing sectors 29. By shifting the position of the servo patterns 32 slightly at servo formatting, the defect can be confined to only two sectors 29. Because the defects may be such as to affect a plurality of tracks 28, the saving of the single sector 29 on a single track 28 can easily translate to saving a much larger number of sectors 29.

All of the defects on both surface 14A, 14B of the disk 10 must be considered and the placement of the formatting servo patterns 32 optimized to be effective for the entire disk surface 14 inasmuch as the servo patterns 32 are defined for the entire disk 10, with only its rotational placement being variable.

The disks 10 and particularly the DINUM 30 on each disk 10 need not be aligned with each other in the disk drive 26, and each of the formatting servo patterns 32 of a disk surface 14 need not precisely align with the patterns on the other disks of the same disk drive 26. In fact, it may prove advantageous to relate a progressive misalignment of the formatting pattern 32, with due regard to sector 29 availability, to reduce lost access time whenever accessing sequential disks 10 in a disk drive 26.

The defect table, i.e., the data on the location and dimensions of the surface defects on the disk surface 14, may be recorded on the data recording surface 16 of the disk 10 after formatting of disk 10. The defect data may be expressed in terms of radial location, rotational position from a datum, such as the DINUM 30, and rotational and radial extent of the defect, and a list of tracks 28 and sectors 29 that are unusable. Other notational schemes also may be used.

Figure 5:
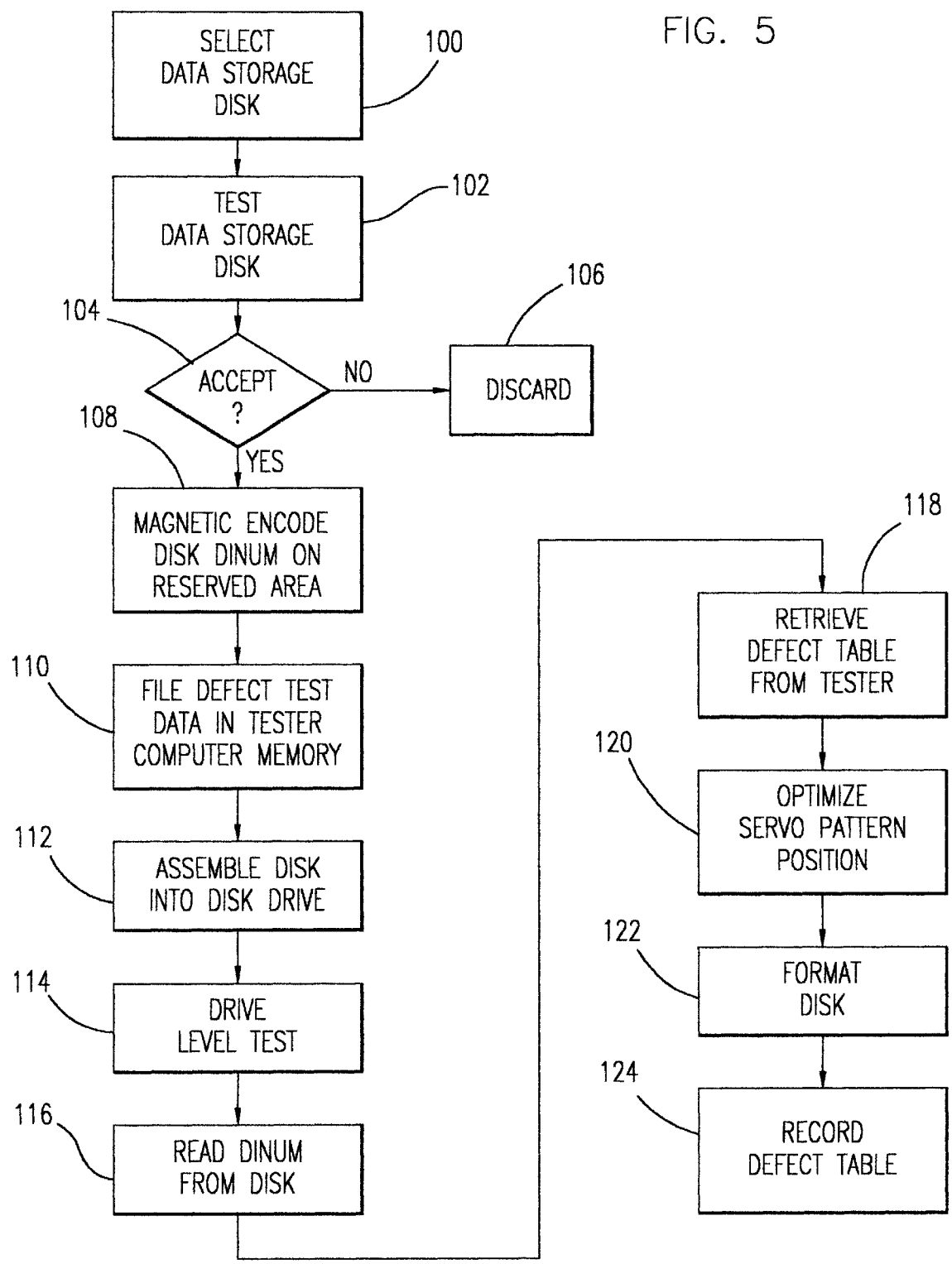
FIG. 5 is a flow diagram of the manufacturing process for the disk and disk drive.

The manufacturing and testing process for a disk 10 and a disk drive 26 is described below. A coated magnetic storage disk 10 is selected at operation 100 of FIG. 5 and both surfaces 14A, 14B of the disk 10 are tested on an individual disk basis for surface defects affecting each disk's ability to accept recordings and to be reliably read by conventional testing techniques. Both surfaces 14A, 14B of the disk 10 are tested in operation 102 to a specific disk test criteria previously established. If sufficient recordable space or area 16 is found to be available on the disk 10 to meet the test criteria and any other test standards met, then the disk 10 is accepted in operation 104.

If the single disk test criteria is not met, the disk 10 is rejected and discarded in operation 106; however, it may be found acceptable for use in a disk drive requiring lesser recording capacity. In operation 108, the accepted disk 10 is magentically encoded using head 24 in landing zone 18 or in some other non-data recording surface (reserved area) with a unique Disk Identification Number (DINUM) 30. The test data, number of defects, and data relating to each defect as to location and size on both surfaces 14A, 14B are stored in the tester computer memory or other suitable memory for future use in operation 110. Thereafter, disk 10 is assembled into a disk drive 26 in operation 112. After assembly, the disk drive 26 then is drive level tested in operation 114 to assure the operability of the disk drive 26.

Upon a successful completion of the drive level test in operation 114, the DINUM 30, a unique identifier, is read from the reserved space 18 by the read/write head 34 of the disk drive 26 in operation 116. The test software uses the DINUM 30 to access the tester of host computer memory to retrieve the surface defect data stored therein during the single disk test in operation 118. The defect data is analyzed to optimize the positioning of the servo patterns 32 in operation 120 in order to minimize the number of sectors affected by the defects. Optimization involves shifting the servo patterns 32 relative to the datum established on the disk 10 by the DINUM 30 location and the positioning of the servo patterns 32 to minimize the number of sectors 29 rendered unusable by the recording surface defects.

The optimization process may be as simple as electronically shifting the servo patterns 32 by small increments and determining the number of unusable sectors 29. The displacement yielding the minimum number of unusable sectors 29 is the preferred location.

After the optimization of the servo patterns 32 positioning in operation 120, the servo patterns 32 are recorded onto the disk 10 during the formatting of the disk in operation 122.

Thereafter, in operation 124, the defect table is magnetically written to the recordable portion 16 of the disk 10 so that the defect data is available in the disk drive 26 when installed and operated. The format of and contents of the defect table is a matter of choice.

The recording of the unique DINUM 30 on a reserved but accessible portion of a disk 10 provides many advantages. One such advantage is the ability to identify a disk 10 in the field while the disk 10 remains within its host disk drive 26. The unique DINUM 30 carried by each disk 10 and readable in the disk drive 26 provides the capability of identifying the disks 10 within a particular disk drive 26. It becomes possible to detect and report disk failures specific to a given surface of a particular disk 10 rather than relative to a large number of drives having disks 10 from a targeted lot or batch. Additionally, if a lot or batch of disks 10 subsequently are found to be substandard, a list a DINUMs 30 that require action, attention, adjustment or maintenance can be distributed. This permits targeting of specific drives 26 for recall or service without disrupting customers or users with a less precisely targeted recall involving a number of disks 10 which need not be subject to recall. By specifically identifying a possibly faulty disk 10, the data stored thereon may be transferred to another disk 10 prior to failure, and the disk drive 26 fixed or replaced at a time of low usage, resulting in minimal disruption.

An additional advantage provided by the invention is that the disk drive 26 can be operated to determine whether the disk 10 is assembled properly in disk drives 26 where only one side of the disk 10 is used for recording data. A failure to detect the DINUM 30 on the read/write head 34 associated with supposed reserved surface 18 would indicate the disk 10 is improperly oriented in the drive 26.

While disks 10 can have serial numbers laser engraved on the disks 10 without special equipment, such a serial number is not readable in and by the disk drive 26 once the disk 10 is assembled into a disk drive 26 without disassembly of the drive 26. Accordingly, a laser engraved disk is not practically, directly identifiable in the disk drive 26.

It should be understood by those skilled in the art that the described approach of recording the DINUM 30 into the reserved space 18 could include types of recording patterns of magnetic recording other than bar coding so long as the recording may be read by the head 34 of the disk drive 26 and the DINUM 30 recording does not affect the servo formatting and the read/write operations on the data region of the disk 10. One skilled in the art will further recognize that other changes may be made to various aspects of the disclosed invention while remaining within the scope of the appended claims.

We claim:

1. Magnetic disk recording medium comprising:

a disk, said disk having a pair of recording surfaces, said recording surfaces being capable of retaining magnetic recording signals for recording data; and a magnetic identification pattern, uniquely identifying said disk, magnetically recorded on one of said recording surfaces, said magnetic recording pattern being readable by a datatransducer capable of reading data recorded in tracks on said one of said pair of recording surfaces, said magntic identification pattern being readable by said data transducer without reference to formatting patterns for defining the locations of said tracks, said magnetic identification pattern comprises an arcuate bar code having a plurality of radially extending bars, each bar extending radially substantially more than the radial with of said tracks.

2. The magnetic disk recording medium of claim 1 wherein said magnetic identification pattern is recorded in a reserved area of said disk surface not normally used for recording data.

3. A rotating disk data storage device comprising:

a disk drive base;

a rotatably mounted disk for recording data, said disk having a pair of recording surfaces, said pair of recording surfaces being capable of retaining magnetic recording signal for recording data;

at least one data transducer associated with each of said recording surfaces for reading and writing data recorded in said tracks on said pair of recording surfaces;

a moveable actuator mounted on said disk drive base for positioning said at least one data transducer to read data recorded on each of said recording surfaces;

a magnetic identification pattern magnetically recorded on one of said pair of recording surfaces, said magnetic identification pattern representing identification formation for said disk; said magnetic identification pattern being readable by one of said at least one data transducer without reference to formatting patterns for defining the location of said tracks, wherein said magnetic identification pattern comprises an arcuate bar code having a plurality of radially extending bars, each bar extending radially substantially more than the radial with of said tracks.

4. The rotating magnetic disk data storage device of claim 3 wherein said magnetic identification pattern is recorded in a reserved area of one of said pair of recording surfaces not normally used for recording data.

5. Magnetic disk recording medium comprising:

a disk, said disk having a pair or recording surfaces, said recording surfaces being capable of retaining magnetic recorded signals for recording data; and a magnetic identification pattern magnetically recorded on one of said recording surfaces, said magnetic identification pattern being readable by a data transducer capable of reading data recorded in tracks on said one of said pair of recording surfaces, said magnetic identification pattern being readable by said data transducer without reference to formatting patterns for defining the locations of said tracks wherein said magnetic identification pattern is recorded in a reserved area of said disk surface not normally used for recording data, and said reserved area is a landing zone for a data transducer head near the center of said medium.

6. The magnetic disk recording medium of claim 5 wherein said magnetic identification pattern comprises an arcuate bar code having a plurality of radially extending bars, each bar extending radially substantially more than the radial width of said tracks.

7. A rotating disk data storage device comprising:

a disk drive base;

a rotatably mounted disk for recording data, said disk having a pair of recording surfaces, said pair of recording surfaces being capable of retaining magnetic recording signal for recording data:

at least one data transducer associated with each of said recording surfaces for reading and writing data recorded in said tracks on said pair of recording surfaces;

a moveable actuator mounted on said disk drive base for positioning said at least one data transducer to read data recorded on each of said recording surfaces;

a magnetic identification pattern magnetically recorded on one of said pair of recording surfaces, in a reserved area, said magnetic identification pattern representing identification information for said disk; said magnetic identification pattern being readable by one of said at least one data transducer without reference to formatting patterns for defining the location of said tracks, wherein said reserved area is a landing zone for a magnetic read/write data transducer near the center of said disk.

8. The rotating magnetic disk data storage device of claim 7 wherein said magnetic identification pattern is recorded in a reserved area of one of said pair of recording surfaces not normally used for recording data.

9. The rotating magnetic disk data storage device of claim 7 wherein said magnetic identification pattern comprises an arcuate bar code having a plurality of radially extending bars, each bar extending radially substantially more than the radial width of said tracks.

* * * * *